United States Patent
Kumar et al.

(10) Patent No.: US 12,356,357 B2
(45) Date of Patent: Jul. 8, 2025

(54) METHOD AND APPARATUS FOR DOWNLINK UPLINK COLLISION HANDLING IN WIRELESS COMMUNICATION NETWORK

(71) Applicant: Samsung Electronics Co., Ltd., Suwon-si (KR)

(72) Inventors: Lalith Kumar, Bangalore (IN); Kundan Tiwari, Bangalore (IN); Debabrata Das, Bangalore (IN); Anikethan Ramakrishna Vijaya Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/662,210

(22) Filed: May 13, 2024

(65) Prior Publication Data
US 2024/0298287 A1 Sep. 5, 2024

Related U.S. Application Data

(63) Continuation of application No. 17/635,239, filed as application No. PCT/KR2020/010498 on Aug. 7, 2020, now Pat. No. 11,997,637.

(30) Foreign Application Priority Data

Aug. 22, 2019 (IN) .............................. 201941033812
Jul. 27, 2020 (IN) .............................. 2019 41033812

(51) Int. Cl.
*H04W 60/06* (2009.01)
*H04W 60/02* (2009.01)
(Continued)

(52) U.S. Cl.
CPC ........... *H04W 60/06* (2013.01); *H04W 60/02* (2013.01); *H04W 76/34* (2018.02); *H04W 88/12* (2013.01)

(58) Field of Classification Search
CPC ..... H04W 60/06; H04W 60/02; H04W 76/34; H04W 88/12; H04W 88/06; H04W 88/14; H04W 4/70
See application file for complete search history.

(56) References Cited

U.S. PATENT DOCUMENTS 11,317,451 B2    4/2022 Ying et al.
2013/0023275 A1*  1/2013 Mutya ............... H04W 88/06
                                                    455/452.1
(Continued)

FOREIGN PATENT DOCUMENTS

WO    2019/032972 A1    2/2019

OTHER PUBLICATIONS

'3GPP; TSG CT; Non-Access-Stratum (NAS) protocol; for 5G System (5GS); Stage 3 (Release 16)', 3GPP TS 24.501 V16.1.0, Jun. 14, 2019.

(Continued)

*Primary Examiner* — Redentor Pasia
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments herein disclose a method for down- (Continued)

link uplink collision handling in a wireless communication network.

16 Claims, 18 Drawing Sheets

(51) Int. Cl.
*H04W 76/34* (2018.01)
*H04W 88/12* (2009.01)

(56) References Cited

U.S. PATENT DOCUMENTS

| | | | |
|---|---|---|---|
| 2013/0172023 A1* | 7/2013 | Chan | H04W 76/15 |
| | | | 455/466 |
| 2018/0376445 A1* | 12/2018 | Yoon | H04W 8/20 |
| 2019/0007500 A1 | 1/2019 | Kim et al. | |
| 2019/0357037 A1* | 11/2019 | Velev | H04W 60/04 |
| 2019/0394745 A1 | 12/2019 | Yu | |
| 2020/0008167 A1* | 1/2020 | Venkataraman | H04W 76/16 |
| 2020/0177333 A1* | 6/2020 | Liu | H04W 76/25 |
| 2020/0178196 A1 | 6/2020 | Wang et al. | |
| 2021/0282105 A1 | 9/2021 | Rajput | |
| 2022/0240213 A1 | 7/2022 | Ly et al. | |
| 2023/0354447 A1 | 11/2023 | Fard et al. | |

OTHER PUBLICATIONS

Apple et al., 'Collision handling of UE initiated Deregistration Message', C1-185256, 3GPP TSGCT WG1 Meeting #112, West Palm Beach, FL (USA), Aug. 13, 2018.
Mediatek Inc., 'Abnormal case handling for cause#72', C1-190345, 3GPP TSG CT WG1 Meeting #114, Bratislava, Slovakia, Jan. 14, 2019.
Samsung, "Collision handling", 3GPP Draft, C1-193729, 3rd Generation Partnership Project (3GPP), 3GPP TSG-CT WG1 Meeting #117, Reno (NV), USA, Jun. 2, 2019.
Extended European Search Report dated Aug. 8, 2022, issued in European Patent Application No. 20855019.4-1218.
Indian Office Action dated Dec. 19, 2022, issued in Indian Patent Application No. 201941033812.
European Office Action dated Jul. 7, 2023, issued in European Patent Application No. 20 855 019.4.
Samsung; Collision of deregistration and other NAS procedure, 3GPP TSG-CT WG1 Meeting #119, C1-194523, Aug. 19, 2019, Wroclaw, Poland.

* cited by examiner

METHOD AND APPARATUS FOR DOWNLINK UPLINK COLLISION HANDLING IN WIRELESS COMMUNICATION NETWORK

CROSS-REFERENCE TO RELATED APPLICATION(S)

This application is a continuation application of prior application Ser. No. 17/635,239, filed on Feb. 14, 2022, which has issued as U.S. Pat. No. 11,997,637 on May 28, 2024, which is a U.S. National Stage application under 35 U.S.C. § 371 of an International application number PCT/KR2020/010498, filed on Aug. 7, 2020, which is based on and claims priority of an Indian Provisional patent application number 201941033812, filed on Aug. 22, 2019, in the Indian Patent Office, and of an Indian Non-Provisional patent application number 201941033812, filed on Jul. 27, 2020, in the Indian Patent Office, the disclosure of each of which is incorporated by reference herein in its entirety.

TECHNICAL FIELD

The present disclosure relates to wireless communication, and more particularly to method, user equipment (UE) and Access and Mobility Management Function (AMF) controller for downlink uplink collision handling in a wireless communication network.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

With advancement in technology wireless communication systems are widely deployed to provide various types of communication (e.g., voice, data, multimedia services, etc.) to a plurality of users. As the number of users rapidly grows, there is a challenge to implement efficient and robust communication systems with enhanced performance.

With 5th generation (5G) technology being the latest of the wireless communication technology deployed, there are some issues which need to be addressed. Consider a scenario where a network initiated deregistration message is sent to a user equipment (UE). The network initiated deregistration message can include one of the access types: i.e., 3rd Generation Partnership Project (3GPP) access, non-3GPP access and both the 3GPP access and the non-3GPP access. This information indicates to the UE which access type context has to be deleted by the UE. Further, the de-registration message may be sent over the 3GPP access and the de-registration message may not be to deregister 3GPPA. The network can request to deregister for the non-3GPP access by sending the de-registration message over the 3GPP access. On reception of the de-registration message, the UE is supposed to delete a non-3GPP context (though the deregistration request message is received over the 3GPP access). This creates a problem that de-registration message is sent over the 3GPP access but the de-registration message was not to delete the 3GPP context, with respect to other NAS procedure which can be initiated by the UE. For example in case the UE had initiated for example a mobile originated (MO) call in the service request, the MO is terminated as the service request procedure is aborted by both the UE and the AMF controller when the collision is encountered by the UE initiated service request procedure and wireless communication network initiated deregistration procedure. Also, the deregistration procedure is initiated only to delete UE context of non-3GPP access and terminating the MO/any service request to accommodate the deregistration procedure may not be worth the same. i.e. though the deregistration procedure was not targeted to deregister the access over which the service request message is sent, the service request procedure is aborted both by the UE and network. Thus once the deregistration procedure is completed, again the UE will be required to initiate the service request procedure and this will create delay to the services UE wanted to initiate. This mechanism will become critical if the service pending on the UE side was critical service like MCPTT (Mission critical Push to Talk) or URLLC (Ultra reliable low latency communication) service for which the delay due to the issue discussed here in the prior art will not be acceptable and will impact the user experience.

Thus, it is desired to address the above mentioned disadvantages or other shortcomings or at least provide a useful alternative.

Solution to Problem

Accordingly the embodiments herein disclose a method performed by a terminal in a mobile communication system. The method includes transmitting, to a network entity, a first message to initiate a service request procedure, receiving, from the network entity, a second message to initiate a deregistration procedure, indicating an access type for the deregistration procedure, and identifying a collision between the service request procedure initiated by the terminal and the deregistration procedure initiated by the network entity, in case that the terminal receives the second message before a reception of a response to the first message from the network entity, wherein the collision is valid in case that the second message indicates the access type over which the service request procedure is attempted.

In an embodiment, the access type for the deregistration procedure includes a 3rd Generation Partnership Project (3GPP) access, a non-3GPP access, and 3GPP access and non-3GPP access.

In an embodiment, the method includes progressing the deregistration procedure with the network entity and aborting the service request procedure, in case that the collision is valid.

In an embodiment, both of the service request procedure and the deregistration procedure are progressed, in case that the access type indicated by the second message does not correspond to an access type over which the service request procedure is attempted.

Accordingly the embodiments herein disclose a method performed by a network entity in a mobile communication system. The method includes transmitting, to a terminal, a second message to initiate a deregistration procedure indicating an access type for the deregistration procedure, receiving, from the terminal, a first message to initiate a service request procedure, and identifying a collision between the service request procedure initiated by the terminal and the deregistration procedure initiated by the network entity, in case that the network entity receives the first message before the deregistration procedure initiated by the network entity is completed, wherein the collision is valid in case that the second message indicates the access type over which the service request procedure is attempted.

In an embodiment, the access type for the deregistration procedure includes a 3rd Generation Partnership Project (3GPP) access, a non-3GPP access, and 3GPP access and non-3GPP access.

In an embodiment, the method includes progressing the deregistration procedure with the terminal in case that the collision is valid.

In an embodiment, both of the service request procedure and the deregistration procedure are progressed, in case that the access type indicated by the second message does not correspond to an access type over which the service request procedure is attempted.

Accordingly the embodiments herein disclose a terminal in a mobile communication system. The terminal includes a transceiver and a controller coupled with the transceiver and configured to transmit, to a network entity via the transceiver, a first message to initiate a service request procedure, receive, from the network entity via the transceiver, a second message to initiate a deregistration procedure, indicating an access type for the deregistration procedure, and identify a collision between the service request procedure initiated by the terminal and the deregistration procedure initiated by the network entity, in case that the terminal receives the second message before a reception of a response to the first message from the network entity, wherein the collision is valid in case that the second message indicates the access type over which the service request procedure is attempted.

In an embodiment, the access type for the deregistration procedure includes a 3rd Generation Partnership Project (3GPP) access, a non-3GPP access, and 3GPP access and non-3GPP access.

In an embodiment, the controller is configured to progress the deregistration procedure with the network entity and abort the service request procedure, in case that the collision is valid.

In an embodiment, both of the service request procedure and the deregistration procedure are progressed, in case that the access type indicated by the second message does not correspond to an access type over which the service request procedure is attempted.

Accordingly the embodiments herein disclose a network entity in a mobile communication system. The network entity includes a transceiver and a controller coupled with the transceiver and configured to transmit, to a terminal via the transceiver, a second message to initiate a deregistration procedure indicating an access type for the deregistration procedure, receive, from the terminal via the transceiver, a first message to initiate a service request procedure, and identify a collision between the service request procedure initiated by the terminal and the deregistration procedure initiated by the network entity, in case that the network entity receives the first message before the deregistration procedure initiated by the network entity is completed, wherein the collision is valid in case that the second message indicates the access type over which the service request procedure is attempted.

In an embodiment, the access type for the deregistration procedure includes a 3rd Generation Partnership Project (3GPP) access, a non-3GPP access, and 3GPP access and non-3GPP access.

In an embodiment, the controller is configured to progress the deregistration procedure with the terminal in case that the collision is valid.

In an embodiment, both of the service request procedure and the deregistration procedure are progressed, in case that the access type indicated by the second message does not correspond to an access type over which the service request procedure is attempted.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

The principal object of the embodiments herein is to provide a method for downlink uplink collision handling in a wireless communication network.

Another object of the embodiments herein is to detect a collision between a service request procedure initiated by a UE and a deregistration procedure initiated by the wireless communication network.

Another object of the embodiments herein is to determine whether an access type in the deregistration request message comprises an access type over which the service request message is sent.

Another object of the embodiments herein is to abort the service request procedure initiated by the UE and proceed with the deregistration procedure initiated by the wireless communication network, on determining that the access type in the deregistration request message comprises the access type over which the service request message is sent.

Another object of the embodiments herein is to proceed with the deregistration procedure initiated by the wireless communication network and proceed with the service request procedure initiated by the UE, on determining that the access type in the deregistration request message does not comprise the access type over which the service request message is sent by the UE.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

MODE FOR THE INVENTION

Figure 1A:
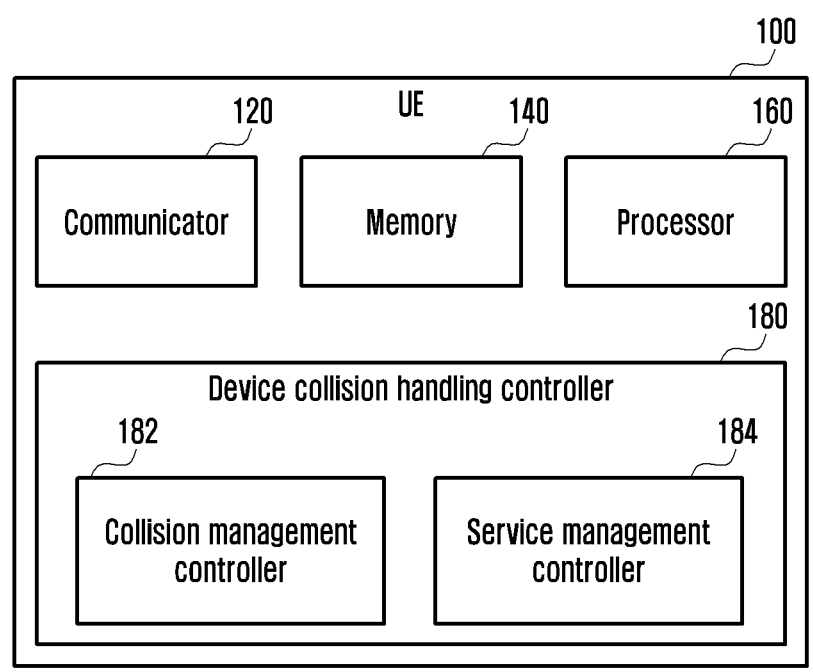
FIG. 1A is a block diagram of a user equipment (UE) (100) for downlink uplink collision handling in a wireless communication network, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly the embodiments herein disclose a method for downlink uplink collision handling in a wireless communication network. The method includes initiating, by an user equipment (UE) (100) of the wireless communication network, a service request procedure by sending a service request message to an AMF controller (200) over one of 3GPP access and a non-3GPP access and receiving, by the UE (100), a deregistration request message from the AMF controller (200) to initiate a deregistration procedure. The deregistration request message comprises a access type for which the deregistration procedure is initiated. Further, the method includes detecting, by the UE (100), the collision between the service request procedure initiated by the UE (100) and the deregistration procedure initiated by the wireless communication network and determining, by the UE (100), whether the access type in the deregistration request message comprises the access type over which the service request message is sent. Furthermore, the method also includes performing, by the UE (100), one of aborting the service request procedure initiated by the UE (100) and proceeding with the deregistration procedure initiated by the wireless communication network, in response to determining that the access type in the deregistration request message comprises the access type over which the service request message is sent, and proceeding with the deregistration procedure initiated by the wireless communication network and proceeding with the service request procedure initiated by the UE (100), in response to determining that the access type in the deregistration request message does not comprise the access type over which the service request message is sent by the UE (100).

Referring now to the drawings and more particularly to FIGS. 1A through 15B, where similar reference characters denote corresponding features consistently throughout the figure, these are shown preferred embodiments.

FIG. 1A is a block diagram of a user equipment (UE) (100) for downlink uplink collision handling in a wireless communication network, according to the embodiments as disclosed herein.

Referring to the FIG. 1A, the UE (100) is for example a mobile phone, a smart phone, Personal Digital Assistant (PDA), a tablet, a wearable device, or the like. The UE (100) includes a communicator (120), a memory (140), a processor (160) and a device collision handling controller (180).

In an embodiment, the communicator (120) is configured to enable communication between the various hardware elements of the UE (100).

The memory (140) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (140) may, in some examples, be considered a non-transitory storage medium. The term "non-transitory" may indicate that the storage medium is not embodied in a carrier wave or a propagated signal. However, the term "non-transitory" should not be interpreted that the memory (140) is non-movable. In some examples, the memory (140) is configured to store larger amounts of information than the memory. In certain examples, a non-transitory storage medium may store data that can, over time, change (e.g., in Random Access Memory (RAM) or cache).

In an embodiment, the processor (160) is configured to execute various instructions stored in the memory (140).

In an embodiment, the device collision handling controller (180) is configured to initiate a service request procedure by sending a service request message to an AMF controller (200) over one of a 3GPP access and a non-3GPP access. Further, the device collision handling controller (180) receives a deregistration request message from the AMF controller (200) to initiate a deregistration procedure. The deregistration request message comprises an access type for which the deregistration procedure is initiated. Further, the device collision handling controller (180) is configured to determine that the deregistration request message from the AMF controller (200) is received before receiving a service accept message or service reject message from the AMF controller (200) and detect the collision between the service request procedure initiated by the UE (100) and the deregistration procedure initiated by the wireless communication network. The service accept message or service reject message indicates a response to the service request procedure initiated by the UE (100).

The device collision handling controller (180) is then configured to determine whether the access type in the deregistration request message comprises the access type over which the service request message is sent. Further, the device collision handling controller (180) is configured to perform one of abort the service request procedure initiated by the UE (100) and proceed with the deregistration procedure initiated by the wireless communication network on determining that the access type in the deregistration request message comprises the access type over which the service request message is sent. Or, the device collision handling controller (180) is configured to proceed with the deregistration procedure initiated by the wireless communication network and proceed with the service request procedure initiated by the UE (100) on determining that the access type in the deregistration request message does not comprise the access type over which the service request message is sent by the UE (100).

Although the FIG. 1A shows the hardware elements of the UE (100) but it is to be understood that other embodiments are not limited thereon. In other embodiments, the UE (100) may include less or more number of elements. Further, the labels or names of the elements are used only for illustrative purpose and does not limit the scope of the invention. One or more components can be combined together to perform same or substantially similar function.

Figure 1B:
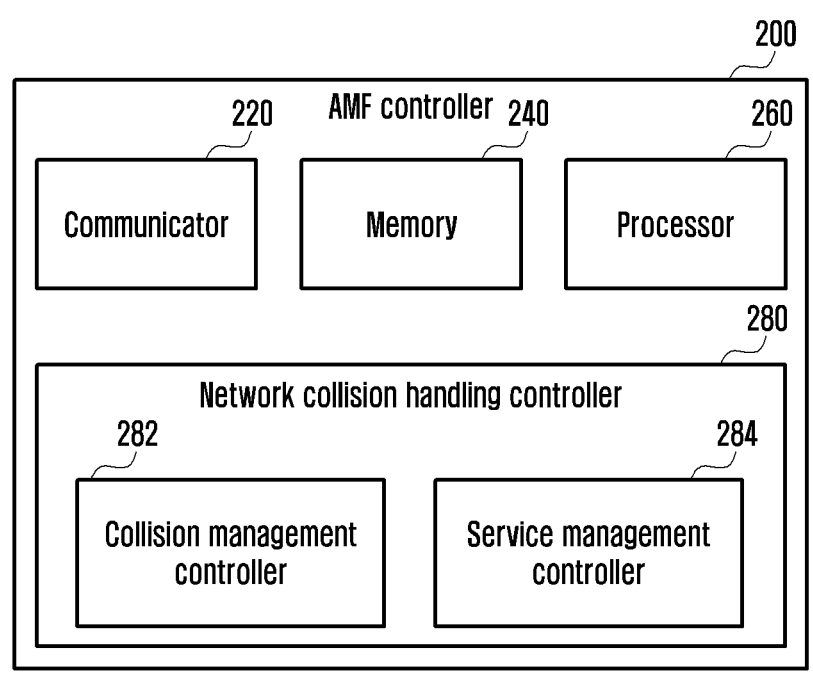
FIG. 1B is a block diagram of an AMF controller (200) for downlink uplink collision handling in the wireless communication network, according to the embodiments as disclosed herein.

FIG. 1B is a block diagram of the AMF controller (200) for downlink uplink collision handling in the wireless communication network, according to the embodiments as disclosed herein.

Referring to the FIG. 1B, the AMF controller (200) includes a communicator (220), a memory (240), a processor (260) and a network collision handling controller (280).

In an embodiment, the communicator (220) is configured to enable communication between the various hardware elements of the AMF controller (200).

The memory (240) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (240) may, in some examples, be considered a non-transitory storage medium. The term "non-transitory" may indicate that the storage medium is not embodied in a carrier wave or a propagated signal. However, the term "non-transitory" should not be interpreted that the memory (240) is non-movable. In some examples, the memory (240) is configured to store larger amounts of information than the memory. In certain examples, a non-transitory storage medium may store data that can, over time, change (e.g., in Random Access Memory (RAM) or cache).

In an embodiment, the processor (260) is configured to execute various instructions stored in the memory (240).

In an embodiment, the network collision handling controller (280) is configured to initiate the deregistration procedure by sending a deregistration request message to the UE (100) and receive the service request message from the UE (100) to initiate a service request procedure. Further, the network collision handling controller (280) is configured to determine that the service request message from the UE (100) is received before receiving the deregistration accept message from the UE (100) and detect the collision between the service request procedure initiated by the UE (100) and the deregistration procedure initiated by the wireless communication network. The deregistration accept message indicates a response of the deregistration procedure initiated by the wireless communication network. The access type is one of the 3GPP access; the non-3GPP access; the 3GPP access and non-3GPP access.

Further, the network collision handling controller (280) is configured to determine whether the access type in the deregistration request message comprises the access type over which service request message is received. Furthermore, the network collision handling controller (280) is configured to perform one of: abort the service request procedure initiated by the UE (100) and proceed with the deregistration procedure initiated by the wireless communication network on determining that the access type in the deregistration request message comprises the access type over which the service request message is received. Or the network collision handling controller (280) is configured to proceed with the deregistration procedure initiated by the wireless communication network for the access type indicated in the deregistration request message and proceed with the service request procedure initiated by the UE (100), in response to determining that the access type in the deregistration request message does not comprise the access type over which the service request message is received.

Although the FIG. 1B shows the hardware elements of the AMF controller (200) but it is to be understood that other embodiments are not limited thereon. In other embodiments, the AMF controller (200) may include less or more number of elements. Further, the labels or names of the elements are used only for illustrative purpose and does not limit the scope of the invention. One or more components can be combined together to perform same or substantially similar function.

Figure 2A:
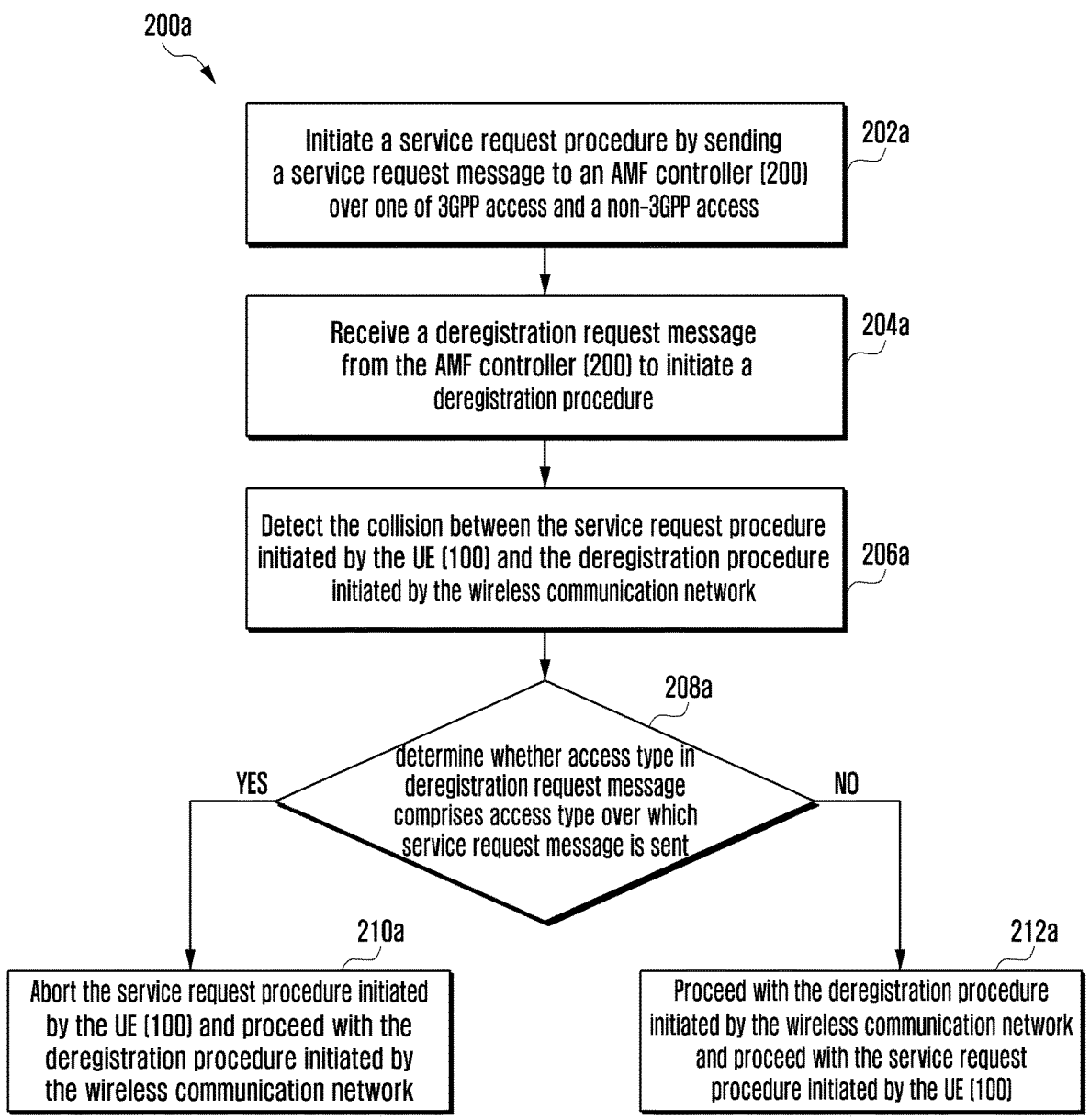
FIG. 2A is a flow chart 200a illustrating a method for downlink uplink collision handling by the UE (100) in the wireless communication network, according to the embodiments as disclosed herein.

FIG. 2A is a flow chart 200a illustrating a method for downlink uplink collision handling by the UE (100) in the wireless communication network, according to the embodiments as disclosed herein.

Referring to the FIG. 2A, at step 202a, the UE (100) initiates the service request procedure by sending the service request message to an AMF controller (200) over one of the 3GPP access and the non-3GPP access. For example, in the UE (100) illustrated in the FIG. 1A, the device collision handling controller (180) is configured to initiate the service request procedure by sending the service request message to an AMF controller (200) over one of the 3GPP access and the non-3GPP access.

At step 204a, the UE (100) receives the deregistration request message from the AMF controller (200) to initiate the deregistration procedure. For example, in the UE (100) illustrated in the FIG. 1A, the device collision handling controller (180) is configured to receive the deregistration request message from the AMF controller (200) to initiate the deregistration procedure.

At step 206a, the UE (100) detects the collision between the service request procedure initiated by the UE (100) and the deregistration procedure initiated by the wireless communication network. For example, in the UE (100) illustrated in the FIG. 1A, the device collision handling controller (180) is configured to detect the collision between the service request procedure initiated by the UE (100) and the deregistration procedure initiated by the wireless communication network.

At step 208a, the UE (100) determines whether the access type in the deregistration request message comprises the access type over which the service request message is sent. For example, in the UE (100) illustrated in the FIG. 1A, the device collision handling controller (180) is configured to detect the collision between the service request procedure initiated by the UE (100) and the deregistration procedure initiated by the wireless communication network.

On determining that the access type in the deregistration request message comprises the access type over which the service request message is sent, at step 210a, the UE (100) aborts the service request procedure initiated by the UE (100) and proceeds with the deregistration procedure initiated by the wireless communication network. For example, in the UE (100) illustrated in the FIG. 1A, the device collision handling controller (180) is configured to abort the service request procedure initiated by the UE (100) and proceed with the deregistration procedure initiated by the wireless communication network, on determining that the access type in the deregistration request message comprises the access type over which the service request message is sent.

On determining that the access type in the deregistration request message does not comprises the access type over which the service request message is sent, at step 212a, the UE (100) proceeds with the deregistration procedure initiated by the wireless communication network and proceeds with the service request procedure initiated by the UE (100). For example, in the UE (100) illustrated in the FIG. 1A, the device collision handling controller (180) is configured to proceed with the deregistration procedure initiated by the wireless communication network and proceed with the service request procedure initiated by the UE (100), on determining that the access type in the deregistration request message comprises the access type over which the service request message is sent.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 2B:
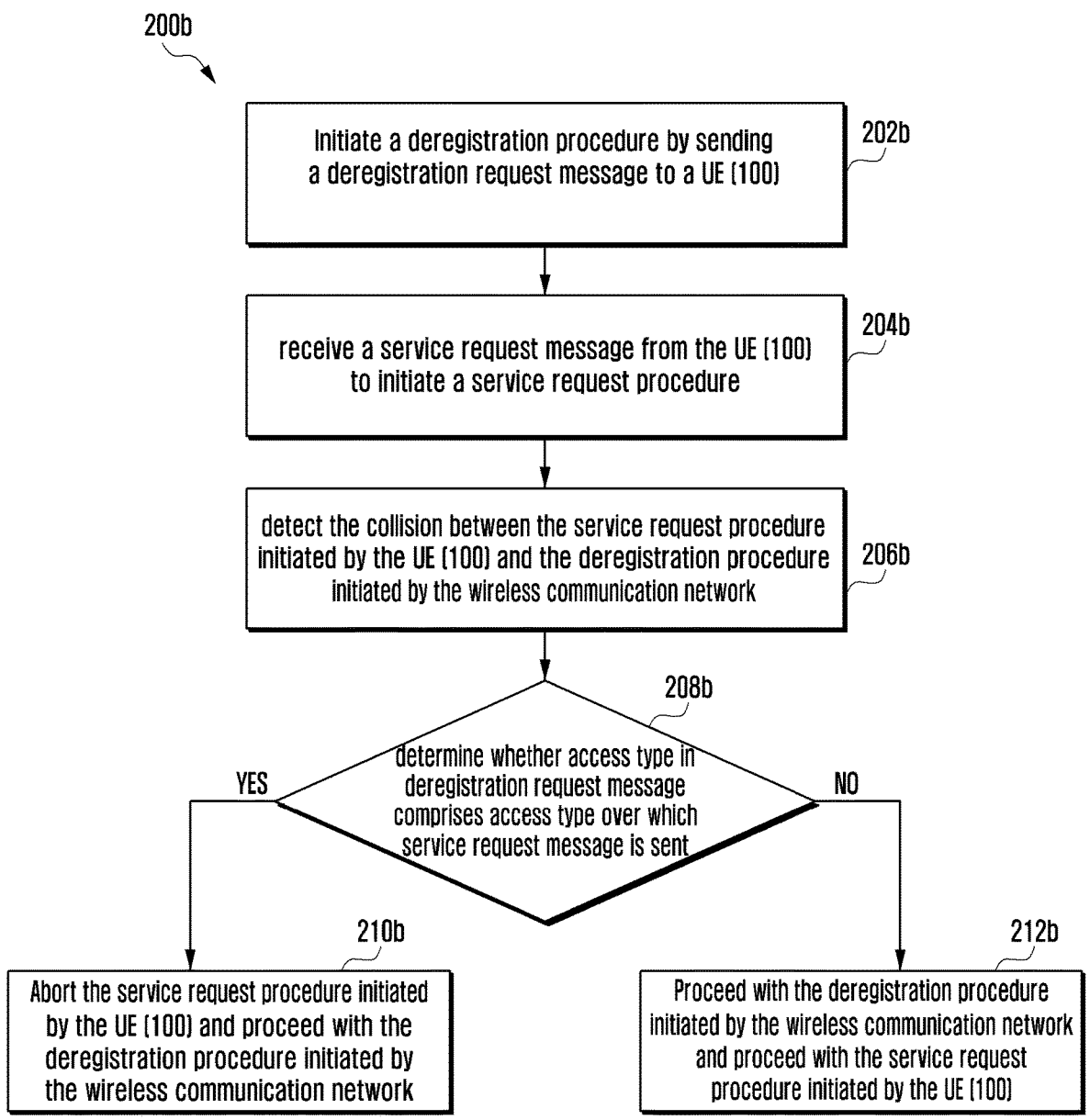
FIG. 2B is a flow chart 200b illustrating a method for downlink uplink collision handling by the AMF controller (200) in the wireless communication network, according to the embodiments as disclosed herein.

FIG. 2B is a flow chart 200b illustrating a method for downlink uplink collision handling by the AMF controller (200) in the wireless communication network, according to the embodiments as disclosed herein.

Referring to the FIG. 2B, at step 202b, the AMF controller (200) initiates the deregistration procedure by sending the deregistration request message to the UE (100). For example, in the AMF controller (200) illustrated in the FIG. 1B, the network collision handling controller (280) is configured to initiates the deregistration procedure by sending the deregistration request message to the UE (100).

At step 204b, the AMF controller (200) receives the service request message from the UE (100) to initiate the service request procedure. For example, in the AMF controller (200) illustrated in the FIG. 1B, the network collision handling controller (280) is configured to receive the service request message from the UE (100) to initiate the service request procedure.

At step 206b, the AMF controller (200) detects the collision between the service request procedure initiated by the UE (100) and the deregistration procedure initiated by the wireless communication network. For example, in the AMF controller (200) illustrated in the FIG. 1B, the network collision handling controller (280) is configured to detect the collision between the service request procedure initiated by the UE (100) and the deregistration procedure initiated by the wireless communication network.

At step 208b, the AMF controller (200) determines whether the access type in the deregistration request message comprises the access type over which the service request message is sent. For example, in the AMF controller (200) illustrated in the FIG. 1B, the network collision handling controller (280) is configured to determine whether the access type in the deregistration request message comprises the access type over which the service request message is sent.

On determining that the access type in the deregistration request message comprises the access type over which the service request message is sent, at step 210b, the AMF controller (200) aborts the service request procedure initiated by the UE (100) and proceeds with the deregistration procedure initiated by the wireless communication network. For example, in the AMF controller (200) illustrated in the FIG. 1B, the network collision handling controller (280) is configured to abort the service request procedure initiated by the UE (100) and proceed with the deregistration procedure initiated by the wireless communication network, on determining that the access type in the deregistration request message comprises the access type over which the service request message is sent.

On determining that the access type in the deregistration request message does not comprises the access type over which the service request message is sent, at step 212a, the AMF controller (200) proceeds with the deregistration procedure initiated by the wireless communication network and proceeds with the service request procedure initiated by the UE (100). For example, in the AMF controller (200) illustrated in the FIG. 1B, the network collision handling controller (280) is configured to proceed with the deregistration procedure initiated by the wireless communication network and proceed with the service request procedure initiated by the UE (100), on determining that the access type in the deregistration request message comprises the access type over which the service request message is sent.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 3:
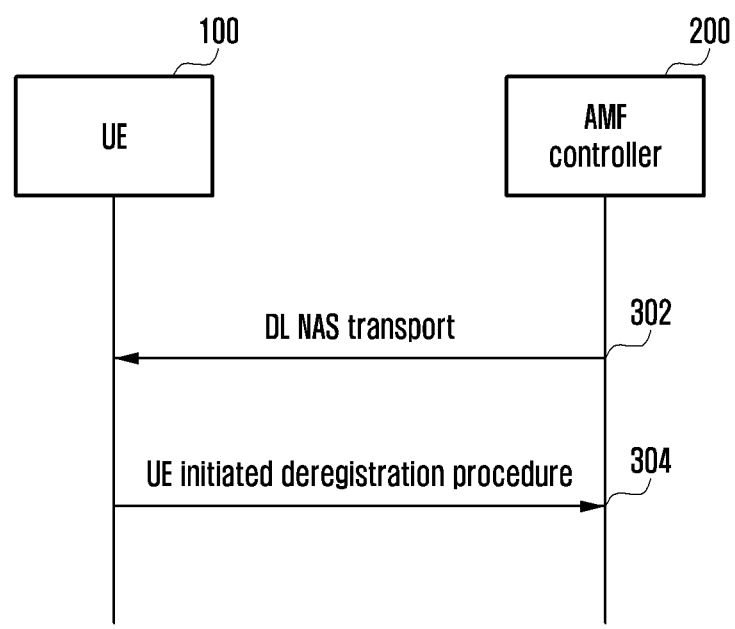
FIG. 3 is a signaling diagram illustrating a scenario of collision in the wireless communication network, according to the prior art.

FIG. 3 is a signaling diagram illustrating a scenario of collision in the wireless communication network, according to the prior art.

Referring to the FIG. 3, consider the UE (100) and the AMF controller (200) which is part of the wireless communication network. Consider a scenario where at step 302, the AMF controller (200) sends one of a downlink (DL) or an uplink (UL) Non-Access Stratum (NAS) transport message with other NAS procedures to the UE (100). Simultaneously, at step 304, on the device side the UE (100) initiates deregistration procedure by sending the deregistration request message to the AMF controller (200). A collision of the NAS procedures initiated by the AMF controller (200) and the deregistration procedure initiated by the UE (100) occurs when the AMF controller (200) receives the deregistration request message from the UE (100) before receiving an acknowledgement for the NAS procedures. The conventional methods and systems have no mechanism by which the collision scenario can be handled, thereby leading to wastage of resources.

Figure 4:
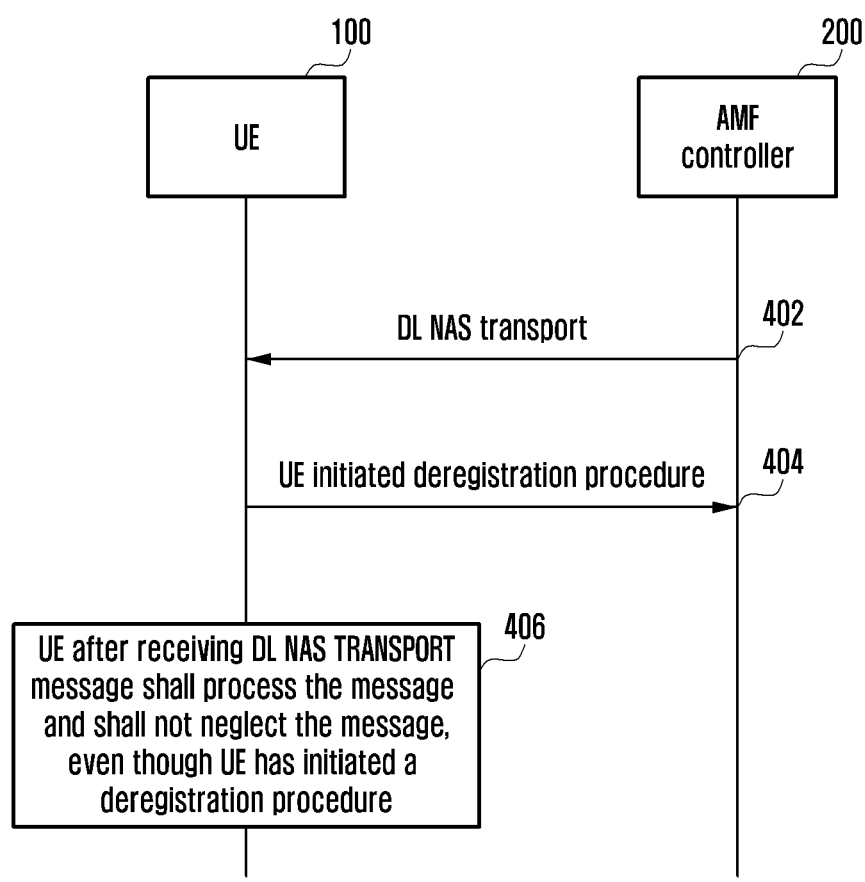
FIG. 4 is a signaling diagram illustrating a scenario of the UE (100) processing a DL NAS transport message during a collision between the DL NAS transport and a UE (100) initiated deregistration procedure, according to an embodiment as disclosed herein.

FIG. 4 is a signaling diagram illustrating a scenario of the UE (100) processing the DL NAS transport message during the collision between the DL NAS transport and the UE (100) initiated deregistration procedure, according to an embodiment as disclosed herein.

Referring to the FIG. 4, at step 402 consider that the AMF controller (200) initiates the DL NAS transport procedure and at the same time the UE (100) initiates the deregistration procedure (as shown in step 404). Since the DL NAS transport procedure and the deregistration procedure are initiated simultaneously, this leads to the collision between the DL NAS transport procedure initiated by the AMF controller (200) and the deregistration procedure initiated by the UE (100).

At step 406, the UE (100), after receiving the DL NAS transport message processes the DL NAS transport message and shall not neglect the DL NAS transport message. Even though the UE (100) has initiated the deregistration procedure.

Figure 5:
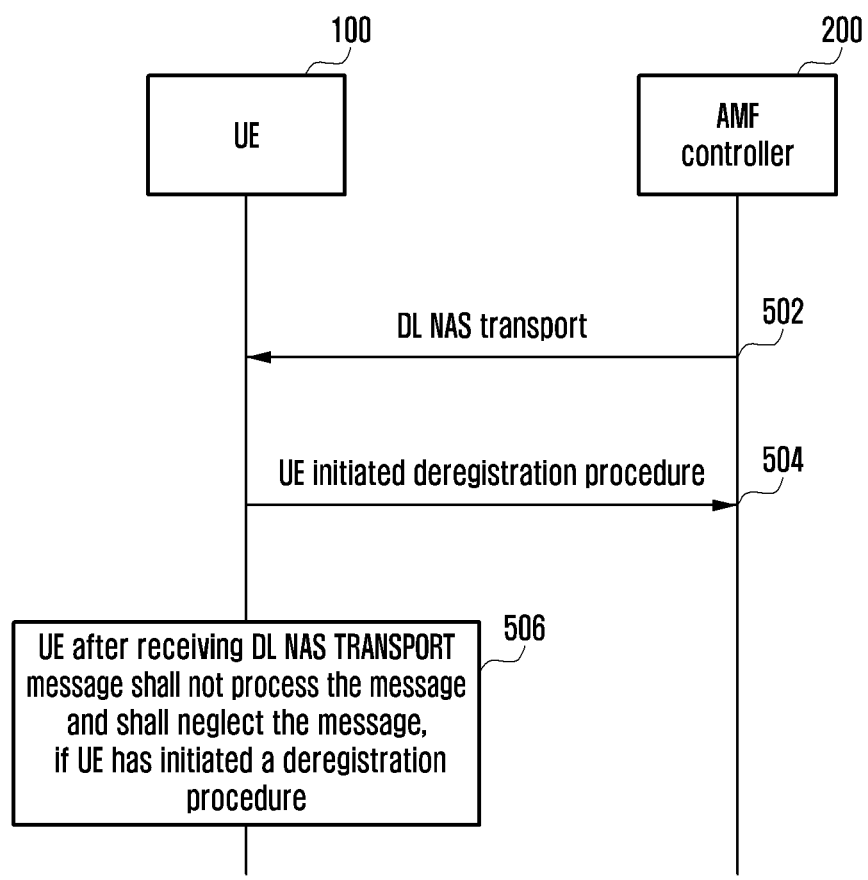
FIG. 5 is a signaling diagram illustrating a scenario of the UE (100) not processing the DL NAS transport message during the collision between the DL NAS transport and the UE (100) initiated deregistration procedure, according to an embodiment as disclosed herein.

FIG. 5 is a signaling diagram illustrating a scenario of the UE (100) not processing the DL NAS transport message during the collision between the DL NAS transport and the UE (100) initiated deregistration procedure, according to an embodiment as disclosed herein.

Referring to the FIG. 5, at step 502 consider that the AMF controller (200) initiates the DL NAS transport procedure and at the same time the UE (100) initiates the deregistration procedure (as shown in step 504). Since the DL NAS transport procedure and the deregistration procedure are initiated simultaneously, this leads to the collision between the DL NAS transport procedure initiated by the AMF controller (200) and the deregistration procedure initiated by the UE (100).

At step 506, the UE (100), after receiving the DL NAS transport message does not process the DL NAS transport message and neglects the DL NAS transport message, if the UE (100) has initiated the deregistration procedure with the AMF controller (200).

Figure 6:
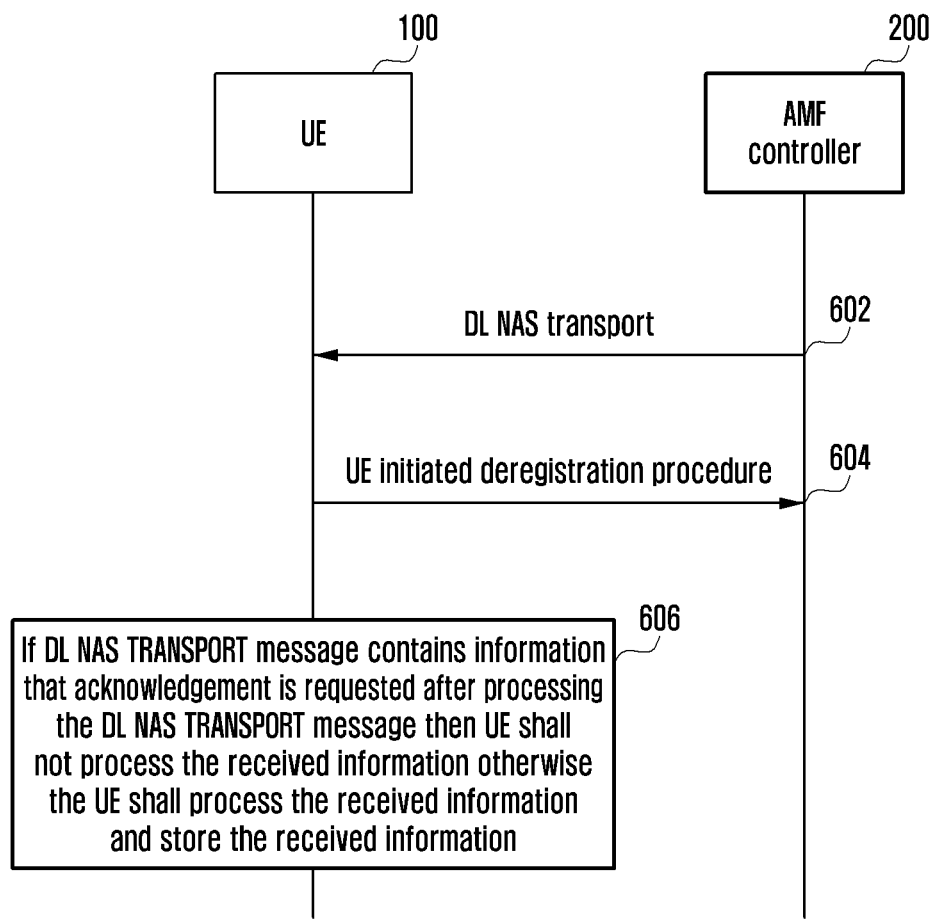
FIG. 6 is a signaling diagram illustrating a scenario of the UE (100) processing the DL NAS transport message during the collision between the DL NAS transport and the UE (100) initiated deregistration procedure only if an acknowledgement is not requested, according to an embodiment as disclosed herein.

FIG. 6 is a signaling diagram illustrating a scenario of the UE (100) processing the DL NAS transport message during the collision between the DL NAS transport and the UE (100) initiated deregistration procedure only if an acknowledgement is not requested, according to an embodiment as disclosed herein.

Referring to the FIG. 6, at step 602 consider that the AMF controller (200) initiates the DL NAS transport procedure and at the same time the UE (100) initiates the deregistration procedure (as shown in step 604). Since the DL NAS transport procedure and the deregistration procedure are initiated simultaneously, this leads to the collision between the DL NAS transport procedure initiated by the AMF controller (200) and the deregistration procedure initiated by the UE (100).

At step 606, the UE (100) on receiving the DL NAS transport message determines the contents of the DL NAS transport message and takes appropriate action based on the contents of the DL NAS transport message. If the DL NAS transport message contains an information that the acknowledgement is requested after processing the DL NAS transport message. For example, for Steering of Roaming (SoR) transparent container, UE policy container or UE parameters update transparent container the acknowledgement may be requested then the UE (100) shall not process the received information (i.e. the UE (100) will not store the information and neglect the DL NAS transport message). If the acknowledgement is not requested after processing the DL NAS transport message, then the UE (100) shall process the received information and store the received information.

Figure 7:
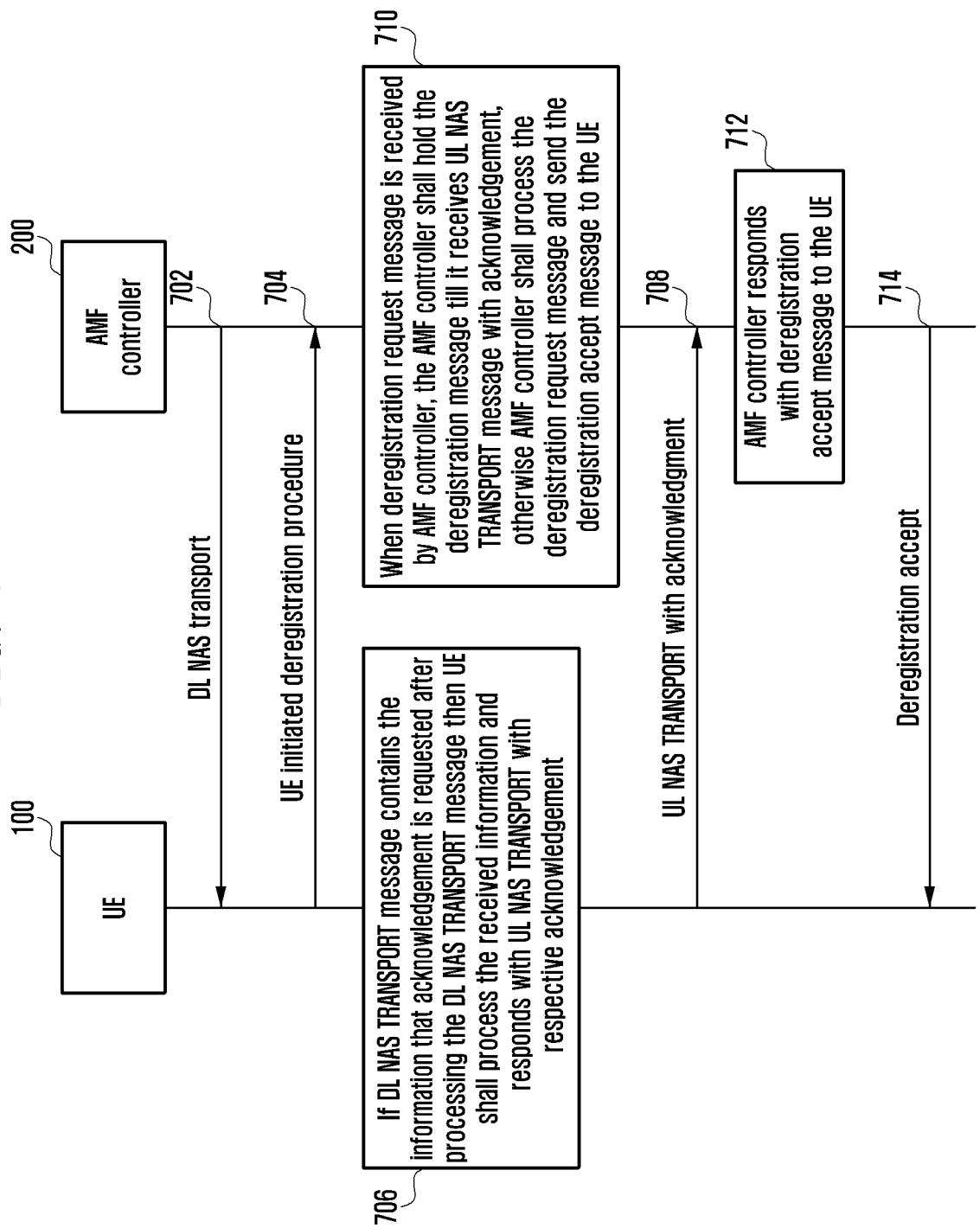
FIG. 7 is a signaling diagram illustrating a scenario of the UE (100) processing the DL NAS transport message during the collision between the DL NAS transport and the UE (100) initiated deregistration procedure when the acknowledgement is requested, according to an embodiment as disclosed herein.

FIG. 7 is a signaling diagram illustrating a scenario of the UE (100) processing the DL NAS transport message during the collision between the DL NAS transport and the UE (100) initiated deregistration procedure when the acknowledgement is requested, according to an embodiment as disclosed herein.

Referring to the FIG. 7, at step 702 consider that the AMF controller (200) initiates the DL NAS transport procedure and at the same time the UE (100) initiates the deregistration procedure (as shown in step 704). Since the DL NAS transport procedure and the deregistration procedure are initiated simultaneously, this leads to the collision between the DL NAS transport procedure initiated by the AMF controller (200) and the deregistration procedure initiated by the UE (100).

At step 706, the UE (100) determines the contents of the DL NAS transport message and take appropriate action. If the DL NAS transport contains the information that the acknowledgement is requested after processing the DL NAS transport message such as for example acknowledgement for SOR transparent container, UE policy container or UE parameters update transparent container, then the UE (100) shall process the received information (i.e. UE will store this information). Further, at step 708, the UE (100) responds with a UL NAS TRANSPORT with respective acknowledgement.

At step 710, when the de-registration request message is received by the AMF controller (200), the AMF controller (200) holds the deregistration message till the AMF controller (200) receives the UL NAS transport message with acknowledgement from the UE (100), if the acknowledgement (ack) is requested for any of the information sent to the UE (100) in the DL NAS transport message. Otherwise the AMF controller (200) shall process the deregistration request message and send the deregistration accept message to the UE (100).

If the AMF controller (200) holds the processing of the deregistration request message because the acknowledgement was requested in the DL NAS TRANSPORT message, then the AMF controller (200) after receiving the UL NAS TRANSPORT message with the acknowledgement of respective payload sends the deregistration accept message to the UE (100) (step 712 and step 714).

Figure 8:
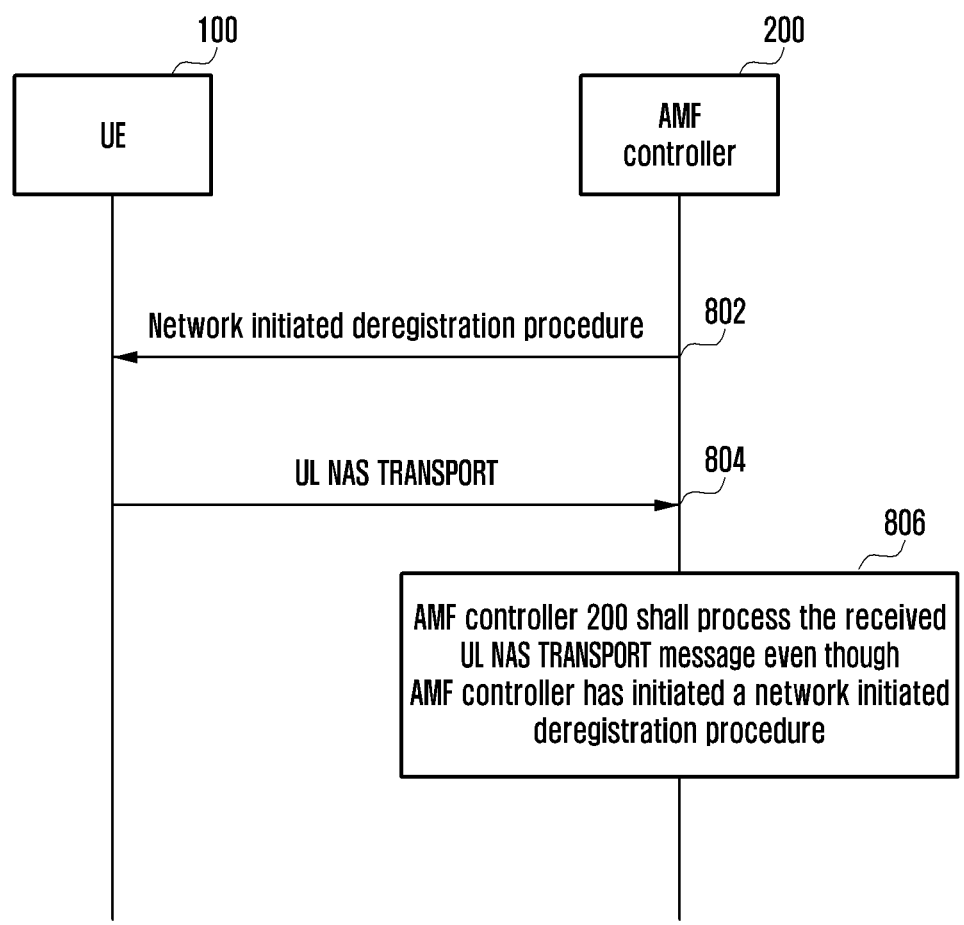
FIG. 8 is a signaling diagram illustrating a scenario of the AMF controller (200) processing a UL NAS transport message during a collision between the UL NAS transport and the AMF controller (200) initiated deregistration procedure, according to an embodiment as disclosed herein.

FIG. 8 is a signaling diagram illustrating a scenario of the AMF controller (200) processing the received UL NAS transport message during the collision between the UL NAS transport and the AMF controller (200) initiated deregistration procedure, according to an embodiment as disclosed herein.

Referring to the FIG. 8, at step 802, consider the AMF controller (200) initiates the deregistration procedure and at the same time at step 804, the UE (100) initiates the UL NAS transport message. Therefore, there is a collision between the deregistration procedure initiated by the AMF controller (200) and the UL NAS transport message initiated by the UE (100).

At step 806, the AMF controller (200) processes the received UL NAS transport message even though the AMF controller (200) has initiated the network initiated deregistration procedures.

Figure 9:
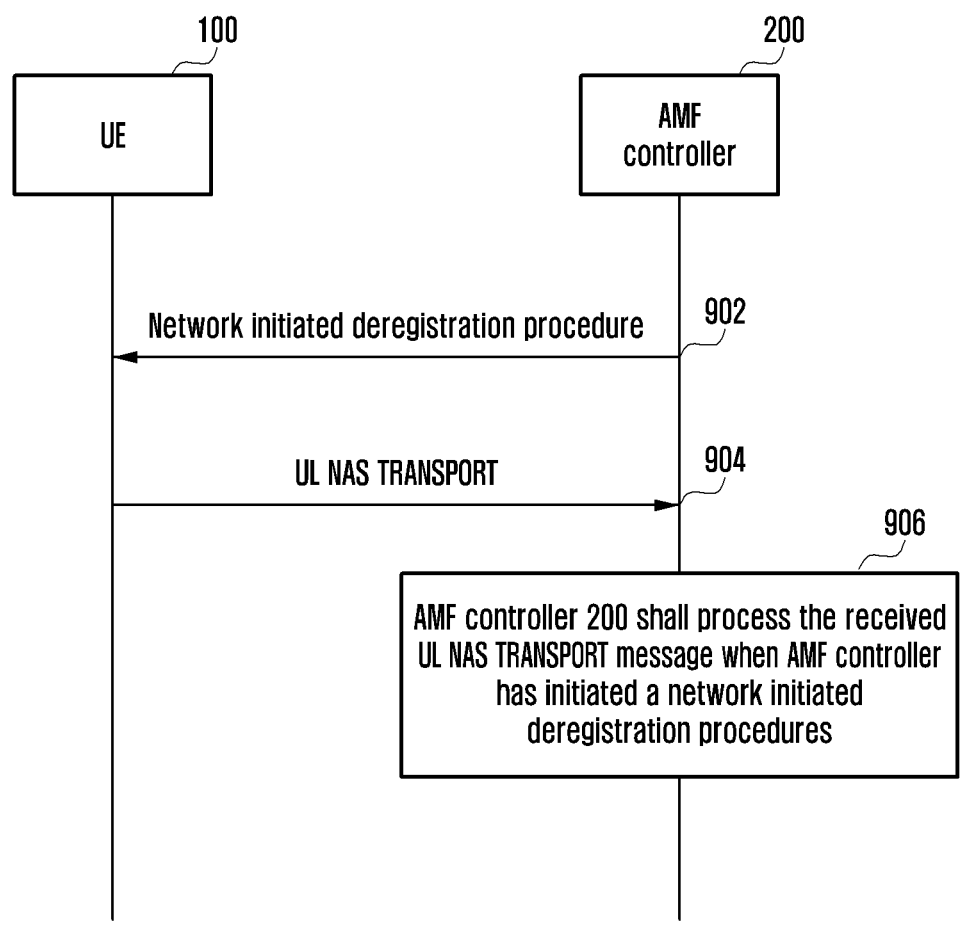
FIG. 9 is a signaling diagram illustrating a scenario of the AMF controller (200) not processing the received UL NAS transport message during the collision between the UL NAS transport and the AMF controller (200) initiated deregistration procedure, according to an embodiment as disclosed herein.

FIG. 9 is a signaling diagram illustrating a scenario of the AMF controller (200) not processing the received UL NAS transport message during the collision between the UL NAS transport and the AMF controller (200) initiated deregistration procedure, according to an embodiment as disclosed herein.

Referring to the FIG. 9, at step 902, consider the AMF controller (200) initiates the deregistration procedure and at the same time at step 904, the UE (100) initiates the UL NAS transport message. Therefore, there is a collision between the deregistration procedure initiated by the AMF controller (200) and the UL NAS transport message initiated by the UE (100).

At step 906, the AMF controller (200) does not process the received UL NAS transport message when the AMF controller (200) has initiated the network initiated deregistration procedures.

Figure 10:
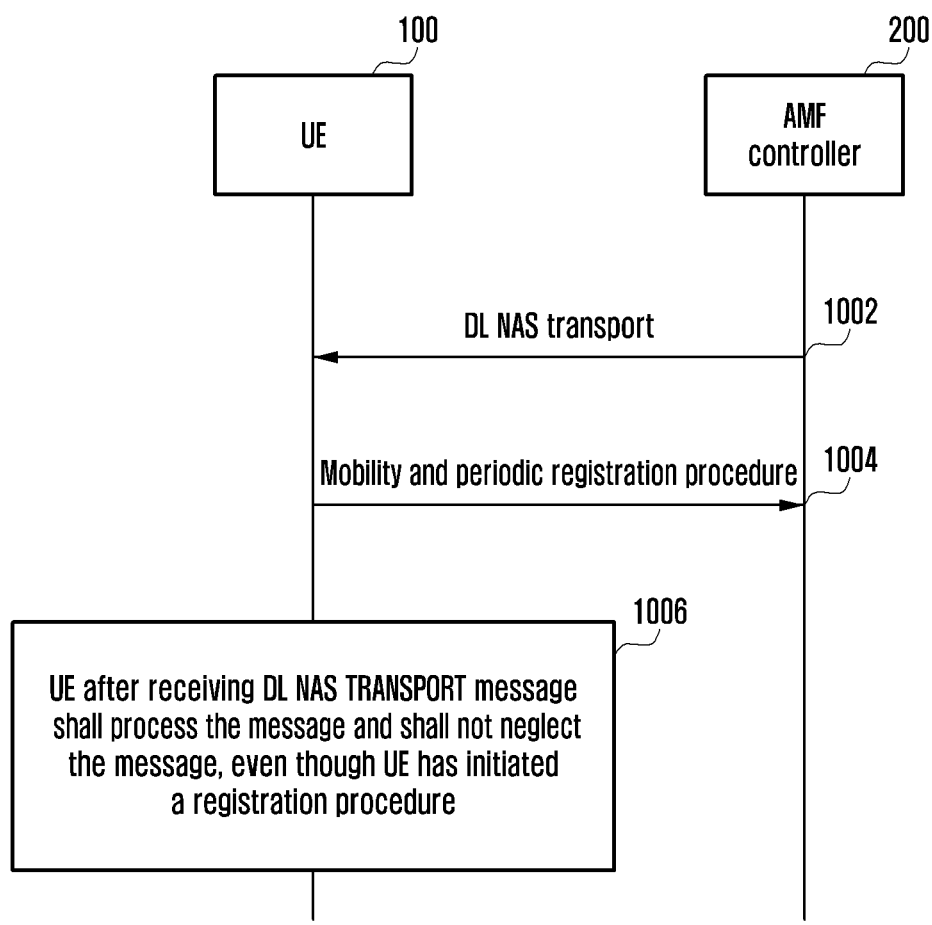
FIG. 10 is a signaling diagram illustrating a scenario of the UE (100) processing the received DL NAS transport message during the collision between a UE (100) initiated mobility and periodic registration procedure and the AMF controller (200) initiated DL NAS transport procedure, according to an embodiment as disclosed herein.

FIG. 10 is a signaling diagram illustrating a scenario of the UE (100) processing the received DL NAS transport message during the collision between the UE (100) initiated mobility and periodic registration procedure and the AMF controller (200) initiated DL NAS transport procedure, according to an embodiment as disclosed herein.

Referring to the FIG. 10, at step 1002, consider the AMF controller (200) initiates the DL NAS transport procedure and at the same time at step 1004, the UE (100) initiates the mobility and periodic registration procedure. Therefore, there is a collision between the DL NAS transport procedure initiated by the AMF controller (200) and the mobility and periodic registration procedure initiated by the UE (100).

At step 1006, the UE (100) after receiving the DL NAS transport message processes the DL NAS transport message and shall not neglect the DL NAS transport message. Even though the UE (100) has initiated the mobility and periodic registration procedure.

Figure 11:
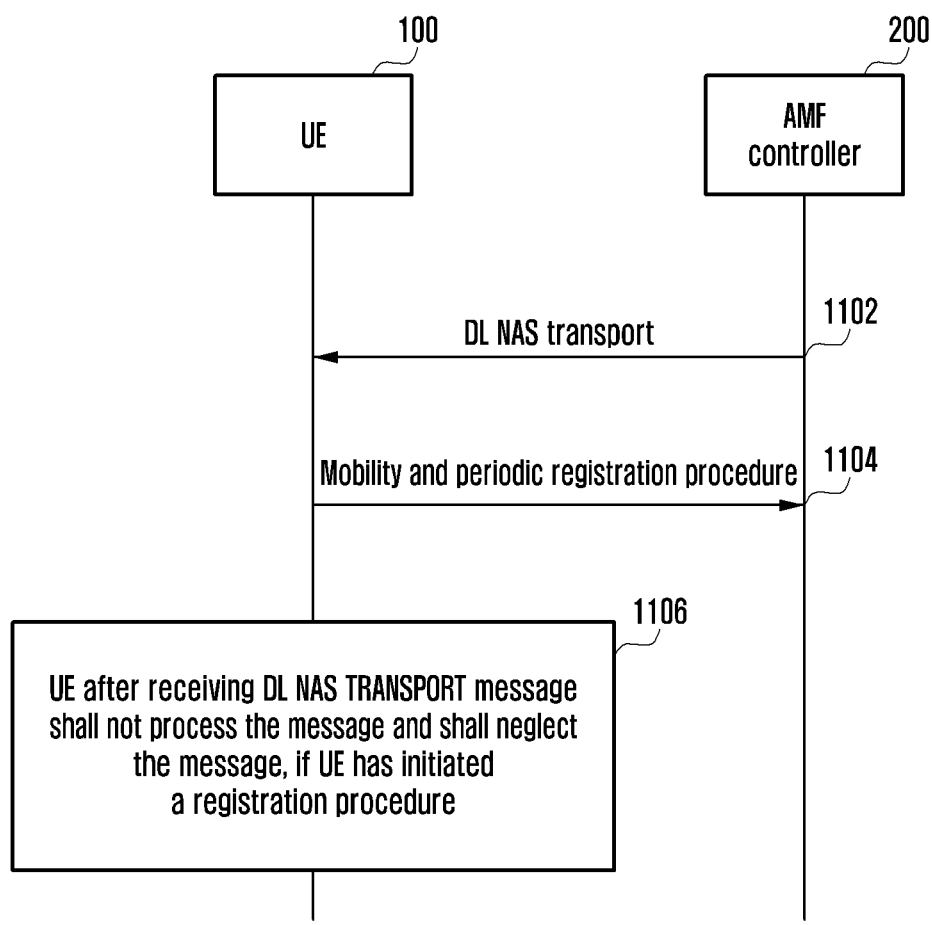
FIG. 11 is a signaling diagram illustrating a scenario of the UE (100) not processing the received DL NAS transport message during the collision between the UE (100) initiated mobility and periodic registration procedure and the AMF controller (200) initiated DL NAS transport procedure, according to an embodiment as disclosed herein.

FIG. 11 is a signaling diagram illustrating a scenario of the UE (100) not processing the received DL NAS transport message during the collision between the UE (100) initiated mobility and periodic registration procedure and the AMF controller (200) initiated DL NAS transport procedure, according to an embodiment as disclosed herein.

Referring to the FIG. 11, at step 1102, consider the AMF controller (200) initiates the DL NAS transport procedure and at the same time at step 1104, the UE (100) initiates the mobility and periodic registration procedure. Therefore, there is a collision between the DL NAS transport procedure initiated by the AMF controller (200) and the mobility and periodic registration procedure initiated by the UE (100).

At step 1106, the UE (100) after receiving the DL NAS transport message does not process the DL NAS transport message and shall neglect the DL NAS transport message. Even though the UE (100) has initiated the mobility and periodic registration procedure.

Figure 12:
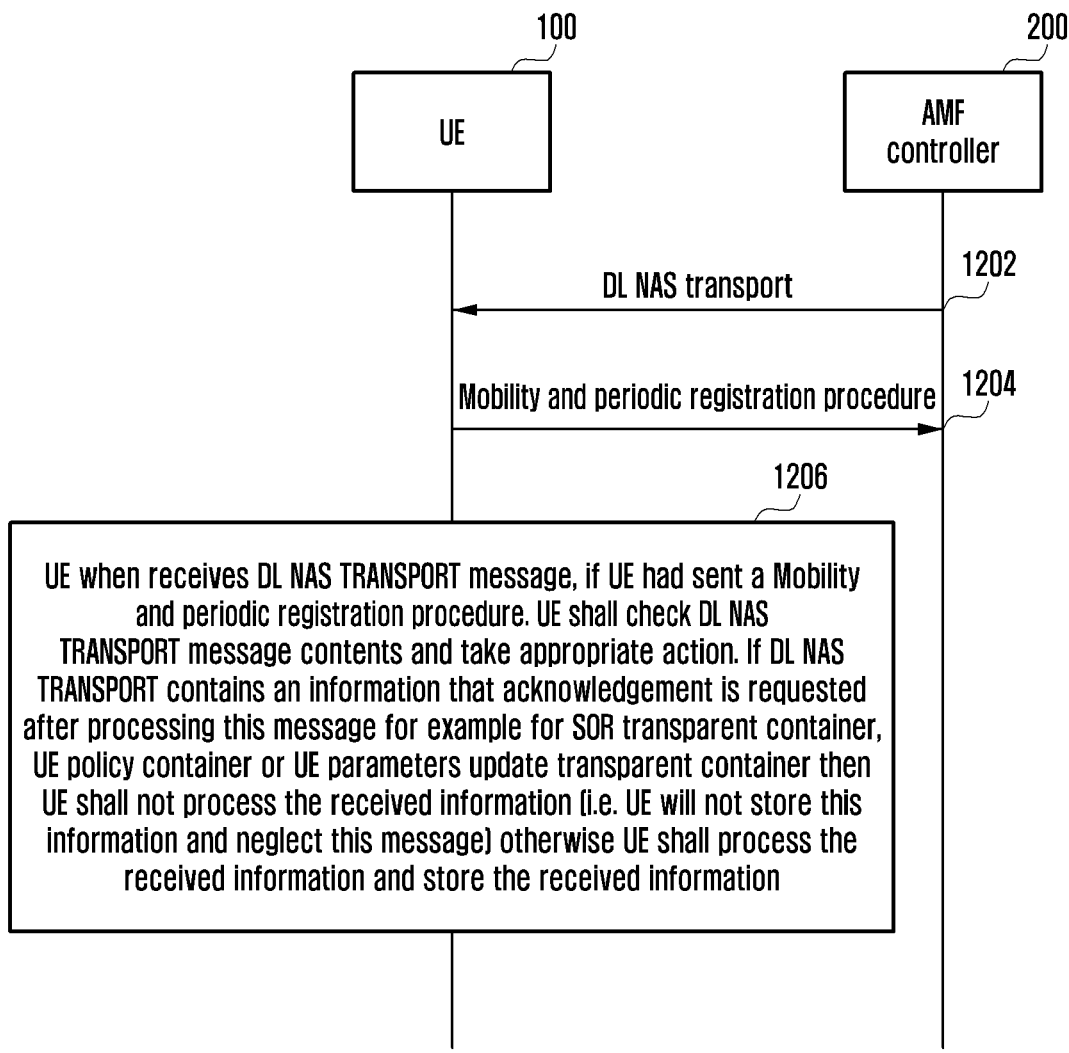
FIG. 12 is a signaling diagram illustrating a scenario of the UE (100) processing the received DL NAS transport message during the collision between the UE (100) initiated mobility and periodic registration procedure and the AMF controller (200) initiated DL NAS transport procedure, only if the acknowledgement is not requested, according to an embodiment as disclosed herein.

FIG. 12 is a signaling diagram illustrating a scenario of the UE (100) processing the received DL NAS transport message during the collision between the UE (100) initiated mobility and periodic registration procedure and the AMF controller (200) initiated DL NAS transport procedure, only if the acknowledgement is not requested, according to an embodiment as disclosed herein.

Referring to the FIG. 12, at step 1202, consider the AMF controller (200) initiates the DL NAS transport procedure and at the same time at step 1204, the UE (100) initiates the mobility and periodic registration procedure. Therefore, there is a collision between the DL NAS transport procedure initiated by the AMF controller (200) and the mobility and periodic registration procedure initiated by the UE (100).

At step 1206, the UE (100) after receiving the DL NAS transport message checks the contents of the DL NAS transport message and takes appropriate action. If the DL NAS transport contains the information that the acknowledgement is requested after processing the DL NAS transport message i.e., for example acknowledgement for the SOR transparent container, the UE policy container or the UE parameters update transparent container then the UE (100) does not process the received information (i.e. the UE (100) will not store the information and neglect the DL NAS transport message) otherwise the UE (100) shall process the received information and store the received information.

Figure 13:
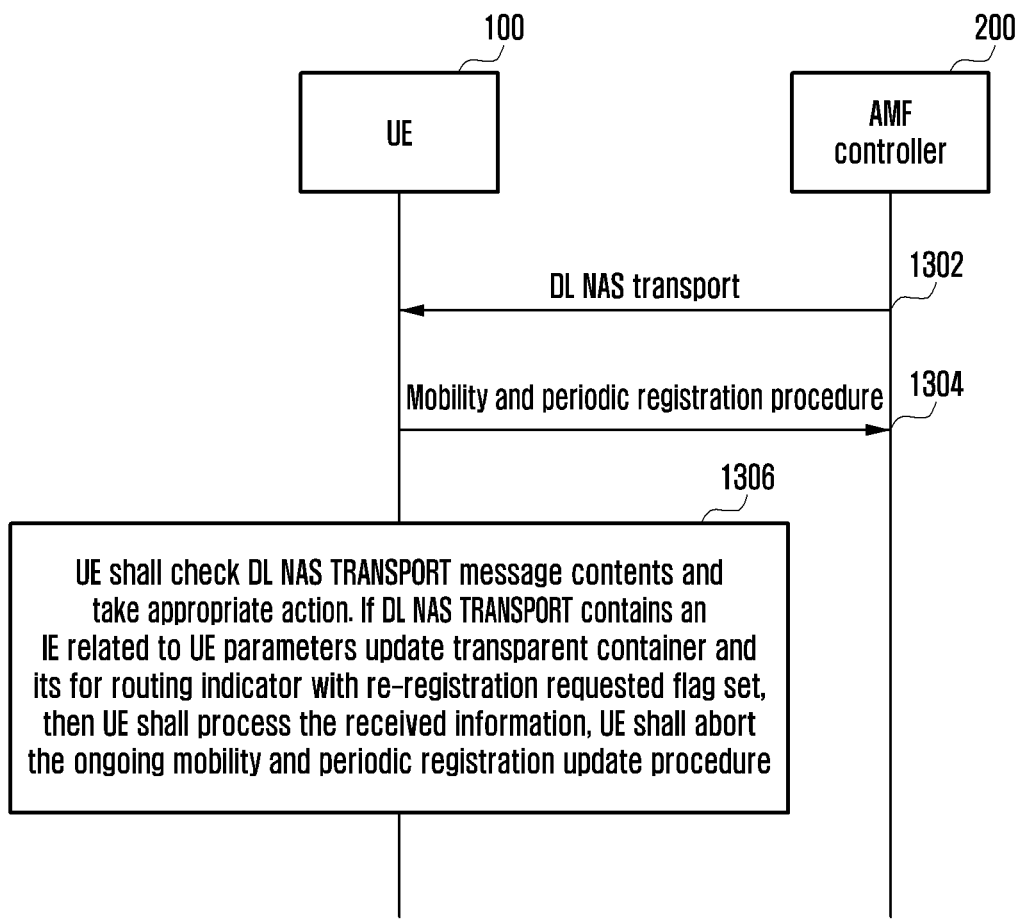
FIG. 13 is a signaling diagram illustrating a scenario of the UE (100) aborting the registration procedure if re-registration flag is set during the collision between the mobility and periodic registration procedure initiated by the UE (100) and the DL NAS transport procedure initiated by the AMF controller (200), according to an embodiment as disclosed herein.

FIG. 13 is a signaling diagram illustrating a scenario of the UE (100) aborting the registration procedure if re-registration flag is set during the collision between the mobility and periodic registration procedure initiated by the UE (100) and the DL NAS transport procedure initiated by the AMF controller (200), according to an embodiment as disclosed herein.

Referring to the FIG. 13 at step 1302, consider the AMF controller (200) initiates the DL NAS transport procedure and at the same time at step 1304, the UE (100) initiates the mobility and periodic registration procedure. Therefore, there is a collision between the DL NAS transport procedure initiated by the AMF controller (200) and the mobility and periodic registration procedure initiated by the UE (100).

At step 1306, the UE (100) checks the contents of the DL NAS TRANPORT message and take appropriate action. If the DL NAS transport contains an information element (IE) related to the UE parameters update transparent container and the IE is for routing indicator with re-registration requested flag set, then the UE (100) processes the received information and aborts the ongoing mobility and periodic registration update procedure.

Figure 14:
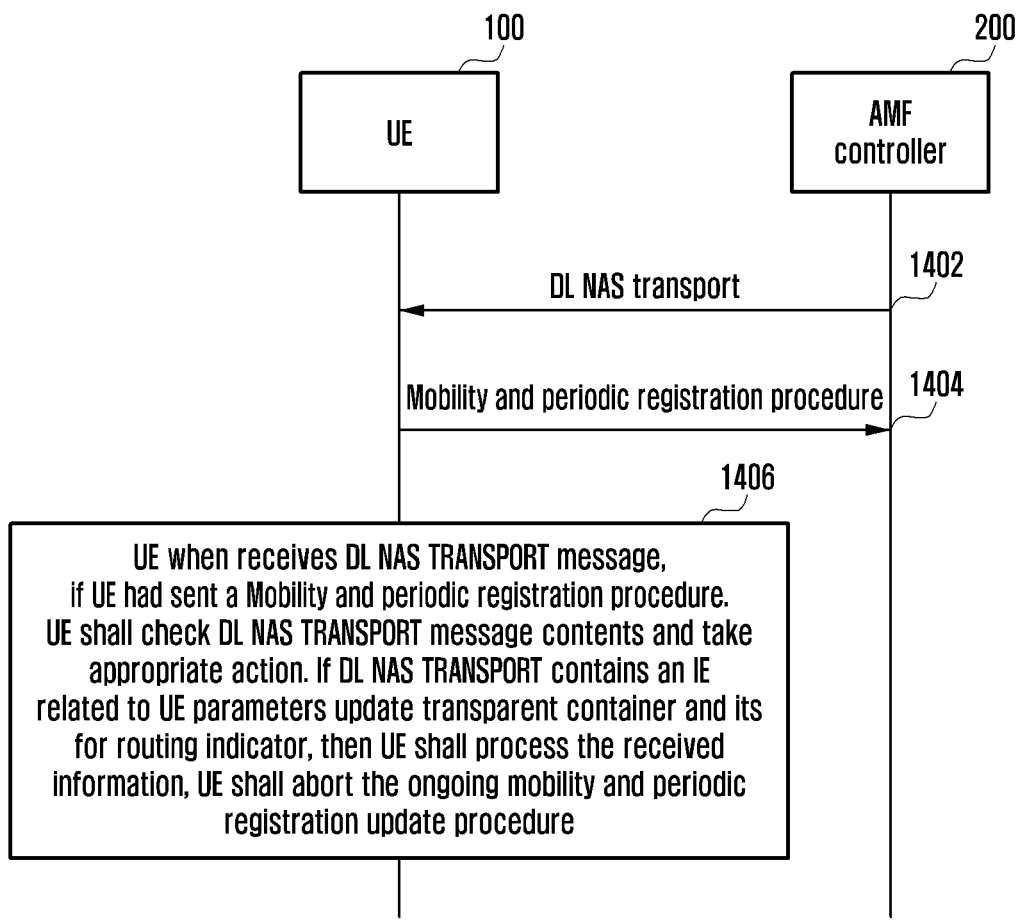
FIG. 14 is a signaling diagram illustrating a scenario of the UE (100) aborting the registration procedure if routing ID is received in the DL NAS transport message, during the collision between the mobility and periodic registration procedure initiated by the UE (100) and the DL NAS transport procedure initiated by the AMF controller (200), according to an embodiment as disclosed herein.

FIG. 14 is a signaling diagram illustrating a scenario of the UE (100) aborting the registration procedure if routing ID is received in the DL NAS transport message, during the collision between the mobility and periodic registration procedure initiated by the UE (100) and the DL NAS transport procedure initiated by the AMF controller (200), according to an embodiment as disclosed herein.

Referring to the FIG. 14 at step 1402, consider the AMF controller (200) initiates the DL NAS transport procedure and at the same time at step 1404, the UE (100) initiates the mobility and periodic registration procedure. Therefore, there is a collision between the DL NAS transport procedure initiated by the AMF controller (200) and the mobility and periodic registration procedure initiated by the UE (100).

At step 1406, the UE (100) checks the contents of the DL NAS TRANPORT message and take appropriate action. If the DL NAS transport contains the IE related to the UE parameters update transparent container and the IE is for routing indicator, then the UE (100) processes the received information and aborts the ongoing mobility and periodic registration update procedure.

Figure 15A:
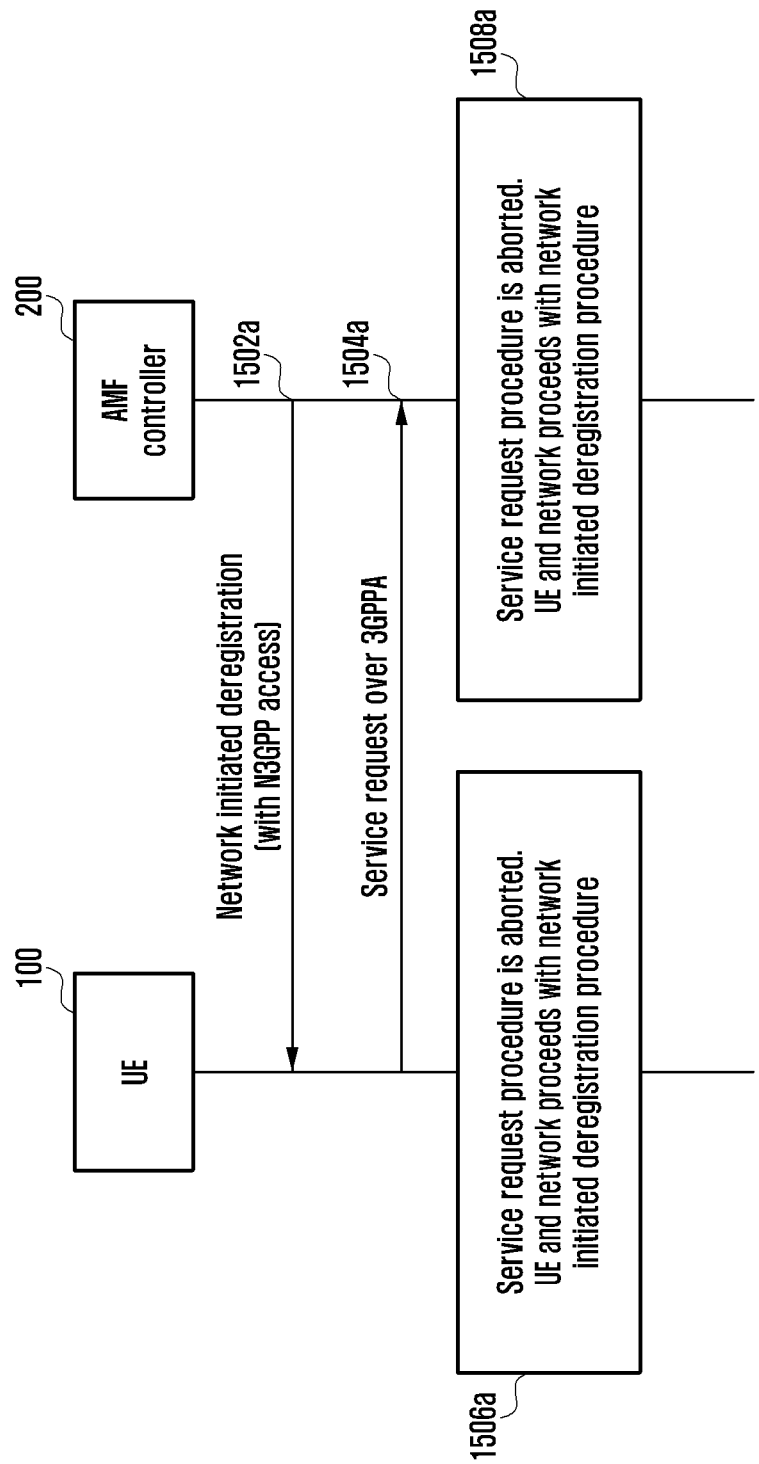
FIG. 15A is a signaling diagram illustrating a scenario of the collision between the service request procedure initiated by the UE (100) over the 3GPP access and the deregistration procedure initiated by the AMF controller (200) over the N3GPP access, according to a prior art.

FIG. 15A is a signaling diagram illustrating a scenario of the collision between the service request procedure initiated by the UE (100) over the 3GPP access and the deregistration procedure initiated by the AMF controller (200) over the N3GPP access, according to a prior art.

Referring to the FIG. 15A at step 1502*a*, consider the AMF controller (200) initiates the deregistration procedure by sending the deregistration request message over the N3GPP access.

At step 1504*a*, the UE (100) initiates the service request procedure by sending the service request message over the 3GPP access before the AMF controller (200) receives a deregistration accept message from the UE (100). Therefore, there is a collision between the deregistration procedure initiated by the AMF controller (200) and the service request procedure initiated by the UE (100).

At step 1506*a*, the UE (100) aborts the service request procedure and proceeds with the network initiated deregistration procedure. Simultaneously, at step 1508*a*, the AMF controller (200) also aborts the service request procedure initiated by the UE (100) and proceeds with the network initiated deregistration procedure.

However, in case the UE (100) had initiated for example a mobile originated (MO) call in the service request, the MO is terminated as the service request procedure is aborted by both the UE (100) and the AMF controller (200). Also, the deregistration procedure is initiated only to delete UE context of non-3GPP access and terminating the MO/any service request to accommodate the deregistration procedure may not be worth the same. i.e. though the deregistration procedure was not targeted to deregister the access over which the service request message is sent, the service request procedure is aborted both by the UE and network. Thus once the deregistration procedure is completed, again the UE will be required to initiate the service request procedure and this will create delay to the services UE wanted to initiate. This mechanism will become critical if the service pending on the UE side was critical service like MCPTT (Mission critical Push to Talk) or URLLC (Ultra reliable low latency communication) service for which the delay due to the issue discussed here in the prior art will not be acceptable and will impact the user experience.

Figure 15B:
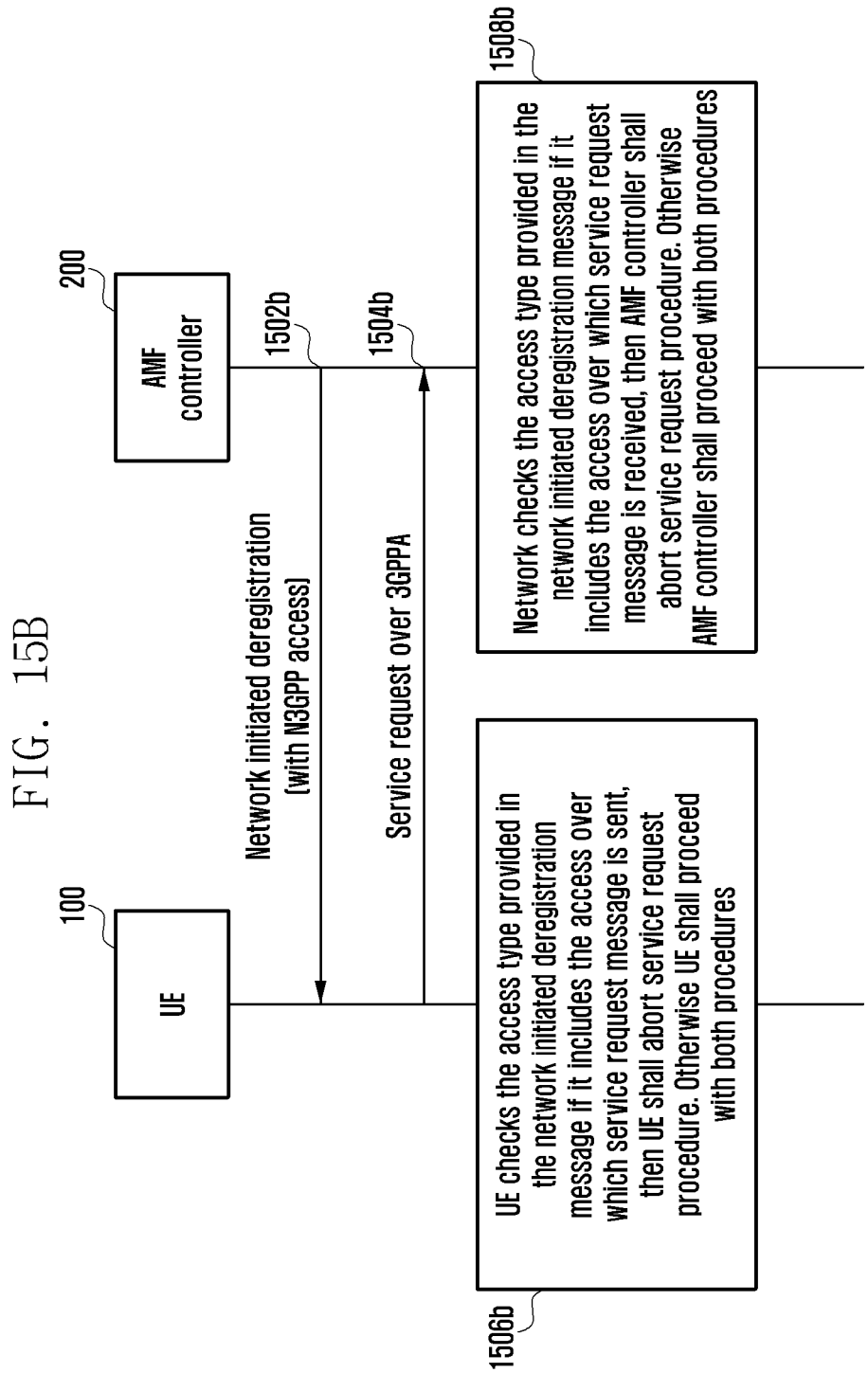
FIG. 15B is a signaling diagram illustrating a scenario of handling the collision between the service request procedure initiated by the UE (100) over the 3GPP access and the deregistration procedure initiated by the AMF controller (200) over the N3GPP access, according to an embodiment as disclosed herein.

FIG. 15B is a signaling diagram illustrating a scenario of handling the collision between the service request procedure initiated by the UE (100) over the 3GPP access and the deregistration procedure initiated by the AMF controller (200) over the N3GPP access, according to an embodiment as disclosed herein.

Referring to the FIG. 15B, in conjunction with the FIG. 15A, the steps 1502*b* and 1504*b* in the FIG. 15B are substantially the same as the steps 1502*a* and the 1504*a* in the FIG. 15A and hence repeated description is omitted.

At step 1506*b*, the UE (100) determines whether the access type in the deregistration request message (N3GPPA in the example) includes the access type over which the service request message is sent (3GPPA in the example). On determining that the access type in the deregistration request message does not include the access type over which the service request message is sent, the UE (100) proceeds with the deregistration procedure initiated by the wireless communication network over the N3GPPA and proceeds with the service request procedure initiated by the UE (100) over the 3GPPA.

However, in case the access type in the deregistration request message included the access type over which the service request message is sent, then the UE (100) aborts the service request procedure initiated by the UE (100) and proceeds with the deregistration procedure initiated by the AMF controller (200).

Similarly, at step 1508*b*, the AMF controller (200) determines whether the access type in the deregistration request message (N3GPPA in the example) includes the access type over which the service request message is sent (3GPPA in the example). On determining that the access type in the deregistration request message does not include the access type over which the service request message is sent, the AMF controller (200) proceeds with the deregistration procedure initiated by the wireless communication network over the N3GPPA and proceeds with the service request procedure initiated by the UE (100) over the 3GPPA. However, in case the access type in the deregistration request message included the access type over which the service request message is sent, then the AMF controller (200) aborts the service request procedure initiated by the UE (100) and proceeds with the deregistration procedure initiated by the AMF controller (200).

In another example, if the network sent the deregistration request message with access type indicating "3GPP access" or "3GPP access and non-3GPP access". Then, if the UE (100) had sent the service request message over the 3GPP access then the UE (100) and the network shall abort the service request procedure and proceed with the network initiated deregistration procedure.

In another example if the network sent the deregistration request message with access type indicating "3GPP access" and if the UE (100) had sent the service request message over the non-3GPP access then the UE (100) and network shall not abort the service request procedure and proceed with both the network initiated deregistration procedure and the service request procedure.

If network had sent the deregistration request message with access type indicating "non-3GPP access" or if on the network side AMF is marked as deregistered state for non-3GPP access and if network receives service request message with "allowed PDU session status" IE over 3GPP access then the network and the UE (100) can abort the service request procedure and proceed with the network initiated deregistration procedure. i.e. the case of service request procedure in response to paging with the non-3GPP access type as indication or notification message received over the 3GPP access.

If network had sent the deregistration request message with access type indicating non-3GPP access or if on the network side AMF is marked as deregistered state for the non-3GPP access and if the network receives the service request message with "allowed PDU session status" IE over the 3GPP access then the network shall ignore the "allowed PDU session status IE". i.e. the case of the service request procedure in response to paging with the non-3GPP access type as indication or notification message received over the 3GPP access.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented through at least one software program running on at least one hardware device and performing network management functions to control the elements. The elements include blocks, elements, actions, acts, steps, or the like which can be at least one of a hardware device, or a combination of hardware device and software module.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method performed by a terminal in a mobile communication system, the method comprising:
   transmitting, to a network entity, a deregistration request message;
   receiving, from the network entity, a downlink (DL) non-access stratum (NAS) transport message;
   identifying a collision between a deregistration procedure and a DL NAS transport procedure, in case that the terminal receives the DL NAS transport message before receiving a response to the deregistration request message from the network entity;
   identifying contents of the DL NAS transport message; and
   in case that the DL NAS transport message includes a steering of roaming (SOR) transparent container and information indicating that an acknowledgement for the SOR transparent container is requested, determining to progress both the deregistration procedure and the DL NAS transport procedure and transmitting, to the network entity, an uplink (UL) NAS transport message including the acknowledgement for the SOR transparent container.

2. The method of claim 1, further comprising receiving, from the network entity, a deregistration accept message.

3. The method of claim 1, wherein the deregistration request message is not processed until the network entity receives the UL NAS transport message.

4. The method of claim 1, further comprising, in case that the contents in the DL NAS transport message do not indicate that acknowledgement for the SOR transparent container is requested, ignoring the DL NAS transport message.

5. A method performed by a network entity in a mobile communication system, the method comprising:
   transmitting, to a terminal, a downlink (DL) non-access stratum (NAS) transport message;
   receiving, from the terminal, a deregistration request message;
   identifying a collision between a deregistration procedure and a DL NAS transport procedure and holding the deregistration request message, in case that the network entity receives the deregistration request message before receiving a response to the DL NAS transport message from the terminal; and
   in case that the DL NAS transport message includes a steering of roaming (SOR) transparent container and information indicating that an acknowledgement for the SOR transparent container is requested, determining to progress both the deregistration procedure and the DL NAS transport procedure and receiving, from the terminal, an uplink (UL) NAS transport message including the acknowledgement for the SOR transparent container.

6. The method of claim 5, further comprising transmitting, to the terminal, a deregistration accept message.

7. The method of claim 5, wherein the deregistration request message is held until the UL NAS transport message is received.

8. The method of claim 5, wherein, in case that the contents in the DL NAS transport message do not indicate that acknowledgement for the SOR transparent container is requested, the DL NAS transport message is not processed.

9. A terminal in a mobile communication system, the terminal comprising:
   a transceiver; and
   a controller configured to:
      transmit, to a network entity via the transceiver, a deregistration request message,
      receive, from the network entity via the transceiver, a downlink (DL) non-access stratum (NAS) transport message,
      identify a collision between a deregistration procedure and a DL NAS transport procedure, in case that the terminal receives the DL NAS transport message before receiving a response to the deregistration request message from the network entity,
      identify contents of the DL NAS transport message, and
      in case that the DL NAS transport message includes a steering of roaming (SOR) transparent container and information indicating that an acknowledgement for the SOR transparent container is requested, determine to progress both the deregistration procedure and the DL NAS transport procedure and transmit, to the network entity via the transceiver, an uplink (UL) NAS transport message including the acknowledgement for the SOR transparent container.

10. The terminal of claim 9, wherein the controller is further configured to receive, from the network entity via the transceiver, a deregistration accept message.

11. The terminal of claim 9, wherein the deregistration request message is not processed until the network entity receives the UL NAS transport message.

12. The terminal of claim 9, wherein the controller is further configured to in case that the contents in the DL NAS transport message do not indicate that acknowledgement for the SOR transparent container is requested, ignore the DL NAS transport message.

13. A network entity in a mobile communication system, the network entity comprising:
   a transceiver; and
   a controller configured to:
      transmit, to a terminal via the transceiver, a downlink (DL) non-access stratum (NAS) transport message,
      receive, from the terminal via the transceiver, a deregistration request message,
      identify a collision between a deregistration procedure and a DL NAS transport procedure and hold the deregistration request message, in case that the network entity receives the deregistration request message before receiving a response to the DL NAS transport message from the terminal, and
      in case that the DL NAS transport message includes a steering of roaming (SOR) transparent container and information indicating that an acknowledgement for the SOR transparent container is requested, determine to progress both the deregistration procedure and the DL NAS transport procedure and receive, from the terminal via the transceiver, an uplink (UL) NAS transport message including the acknowledgement for the SOR transparent container.

14. The network entity of claim 13, wherein the controller is further configured to transmit, to the terminal via the transceiver, a deregistration accept message.

15. The network entity of claim 13, wherein the deregistration request message is held until the UL NAS transport message is received.

16. The network entity of claim 13, wherein, in case that the contents in the DL NAS transport message do not indicate that acknowledgement for the SOR transparent container is requested, the DL NAS transport message is not processed.

* * * * *